(12) United States Patent
Otsuka

(10) Patent No.: US 12,100,998 B2
(45) Date of Patent: Sep. 24, 2024

(54) MOTOR

(71) Applicant: MINEBEA MITSUMI Inc., Nagano (JP)

(72) Inventor: Makoto Otsuka, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 155 days.

(21) Appl. No.: 17/651,847

(22) Filed: Feb. 21, 2022

(65) Prior Publication Data

US 2022/0278575 A1    Sep. 1, 2022

(30) Foreign Application Priority Data

Feb. 26, 2021 (JP) ................................. 2021-031027

(51) Int. Cl.
*H02K 1/278* (2022.01)
*H02K 1/14* (2006.01)
*H02K 1/16* (2006.01)

(52) U.S. Cl.
CPC ............. *H02K 1/278* (2013.01); *H02K 1/146* (2013.01); *H02K 1/16* (2013.01); *H02K 2213/03* (2013.01)

(58) Field of Classification Search
CPC .......... H02K 1/278; H02K 1/146; H02K 1/16; H02K 2213/03; H02K 5/1735; H02K 1/2791; H02K 21/16; H02K 7/14; H02K 1/2786; H02K 1/06; H02K 1/165; H02K 15/024

See application file for complete search history.

(56) References Cited

U.S. PATENT DOCUMENTS

| | | | | |
|---|---|---|---|---|
| 2011/0121675 A1* | 5/2011 | Yamashita | ........... | H02K 1/2791 310/154.25 |
| 2017/0222503 A1* | 8/2017 | Wang | ...................... | H02K 1/146 |
| 2017/0317539 A1* | 11/2017 | Starke | ..................... | D06F 37/30 |
| 2018/0123410 A1* | 5/2018 | Hasebe | ..................... | H02K 1/24 |
| 2019/0103781 A1* | 4/2019 | Imaizumi | ............. | H02K 1/2791 |
| 2021/0050766 A1* | 2/2021 | Lee | ........................ | H02K 1/146 |

FOREIGN PATENT DOCUMENTS

JP        2012-143107 A    7/2012

* cited by examiner

*Primary Examiner* — Christopher M Koehler
*Assistant Examiner* — Riley Owen Stout
(74) *Attorney, Agent, or Firm* — Pearne & Gordon LLP

(57) ABSTRACT

A motor 1 includes a stator having an annular shape; and a rotor including a rotor magnet surrounding the stator, wherein an outer diameter of the rotor is in a range from 80 mm to 100 mm, the stator includes a yoke having an annular shape, a plurality of magnetic pole portions, a plurality of coupling portions connecting the yoke and the plurality of magnetic pole portions to each other, and a plurality of coils each wound around each of the plurality of coupling portions, the rotor magnet is continuously formed of a resin in an annular shape, the number of magnet poles of the rotor magnet is 14×N (pieces) (where N is a positive integer), the number of the plurality of magnetic pole portions is 12×N (pieces), and each of the plurality of magnetic pole portions extends in a circumferential direction.

6 Claims, 7 Drawing Sheets

MOTOR

CROSS-REFERENCE TO RELATED APPLICATIONS

This application claims the benefit of priority to Japanese Application No. JP2021-031027, filed Feb. 26, 2021, the entire disclosure of which is hereby incorporated herein by reference.

TECHNICAL FIELD

The present invention relates to a motor.

BACKGROUND ART

For example, as an outer rotor type motor, there is a motor described, for example, in Patent Literature 1 (in Patent Literature 1, it is described not as a "motor" but as a "rotary electric machine"). Patent Literature 1 describes a motor including a stator core provided with teeth extending toward a rotor magnet, and having specific conditions of the number of magnetic poles of the rotor magnet, the number of the teeth, and the like, and the motor achieves a large back electromotive voltage constant while reducing cogging torque by designing a slot gap angle, in other words an angle formed by the slot gap, within a predetermined range.

In a motor used for, for example, a drone or the like, it is desired to achieve weight reduction as much as possible while having high torque. However, many motors use a material having a relatively large specific gravity such as a metal or a magnetic body as a member of a stator or a rotor. Furthermore, in order to ensure a certain power performance such as high torque, a size larger than a certain degree is necessary, and there are generally many restrictions on weight reduction of the motor.

CITATION LIST

Patent Literature

PTL 1: JP 2012-143107 A

SUMMARY OF INVENTION

Technical Problem

Thus, an object of the present invention is to provide a motor achieving high torque and weight reduction.

Solution to Problem

The above problems are solved by the present invention described below. Specifically, the motor of the present invention includes a stator having an annular shape, and a rotor including a rotor magnet surrounding the stator, wherein an outer diameter of the rotor is in a range from 80 mm to 100 mm, the stator includes a yoke having an annular shape, a plurality of magnetic pole portions, a plurality of coupling portions connecting the yoke and the plurality of magnetic pole portions to each other, and a plurality of coils each wound around each of the plurality of coupling portions, the rotor magnet is continuously formed of a resin in an annular shape, the number of magnet poles of the rotor magnet is 14×N (pieces) (where N is a positive integer), the number of the plurality of magnetic pole portions is 12×N (pieces), and each of the plurality of magnetic pole portions extends in a circumferential direction.

In the present invention, in a case of assuming an outer diameter of the rotor as 100, a width of at least one of the plurality of coupling portions in a circumferential direction is in a range from 1.5 to 2.5.

In the present invention, in a case of assuming an outer diameter of the rotor as 100, a thickness of the rotor magnet in a radial direction is preferably in a range from 1.5 to 2.5.

Further, in the present invention, the rotor includes a yoke having an annular shape, the rotor magnet is fixed to an inner surface of the yoke of the rotor, and in a case of assuming an outer diameter of the rotor as 100, a thickness of the yoke of the rotor in a radial direction is preferably in a range from 0.5 to 1.0.

DESCRIPTION OF EMBODIMENTS

Embodiments being exemplary aspects of the present invention will be described below with reference to the drawings.

Figure 1:
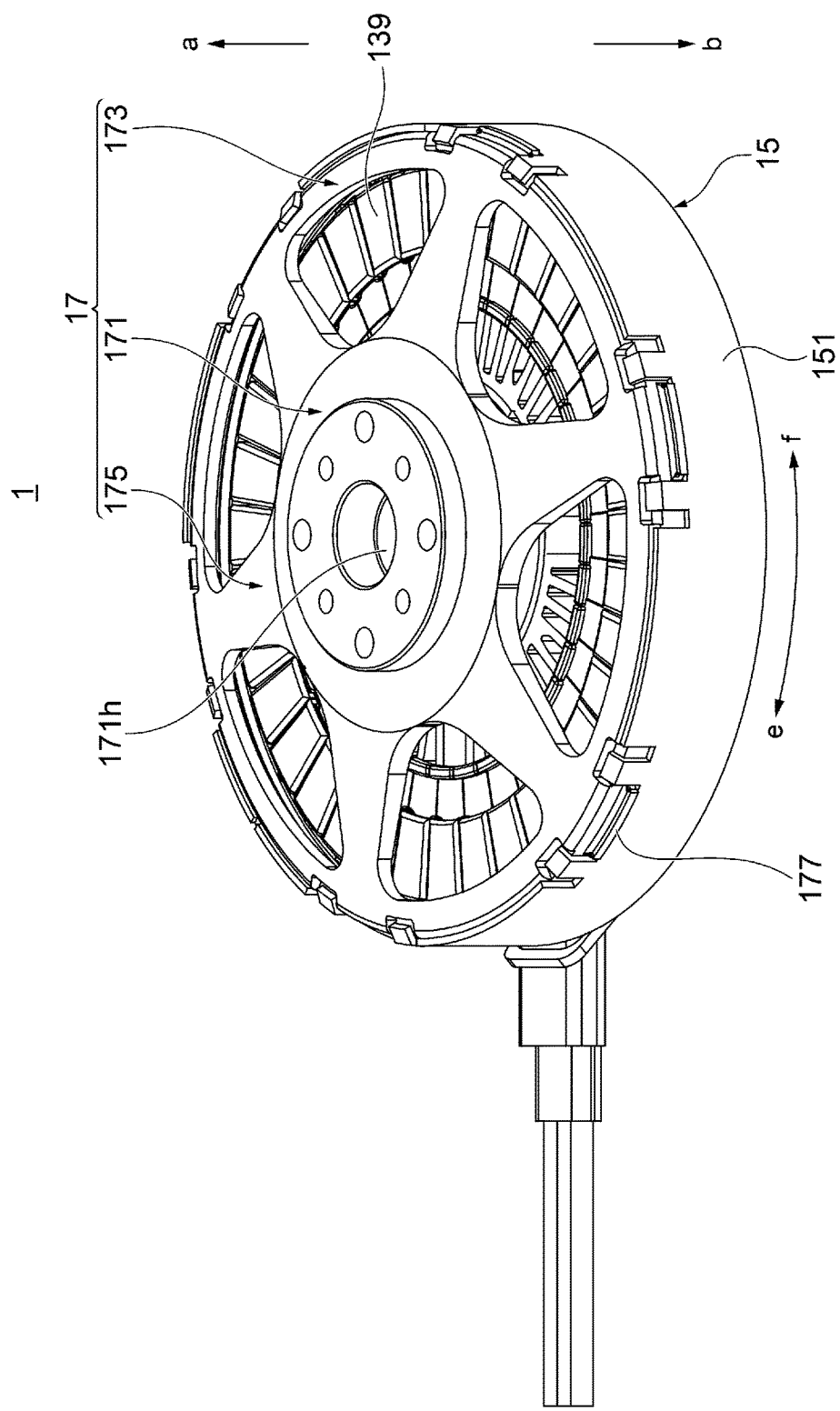
FIG. 1 is a perspective view illustrating an overall configuration of an outer rotor type motor according to an embodiment of the present invention.
Figure 2:
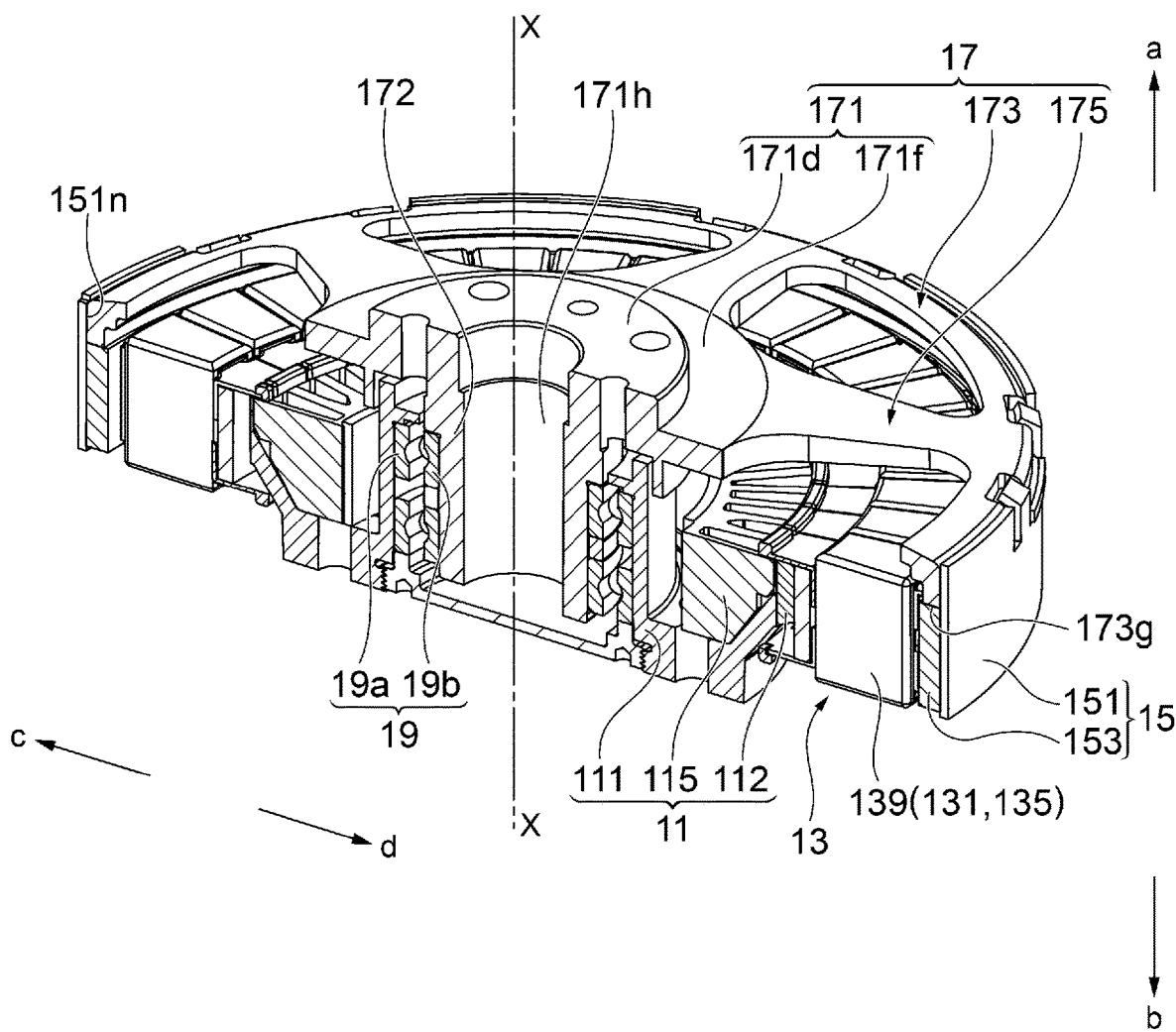
FIG. 2 is a cross-sectional perspective view of a motor according to an embodiment of the present invention.
Figure 3:
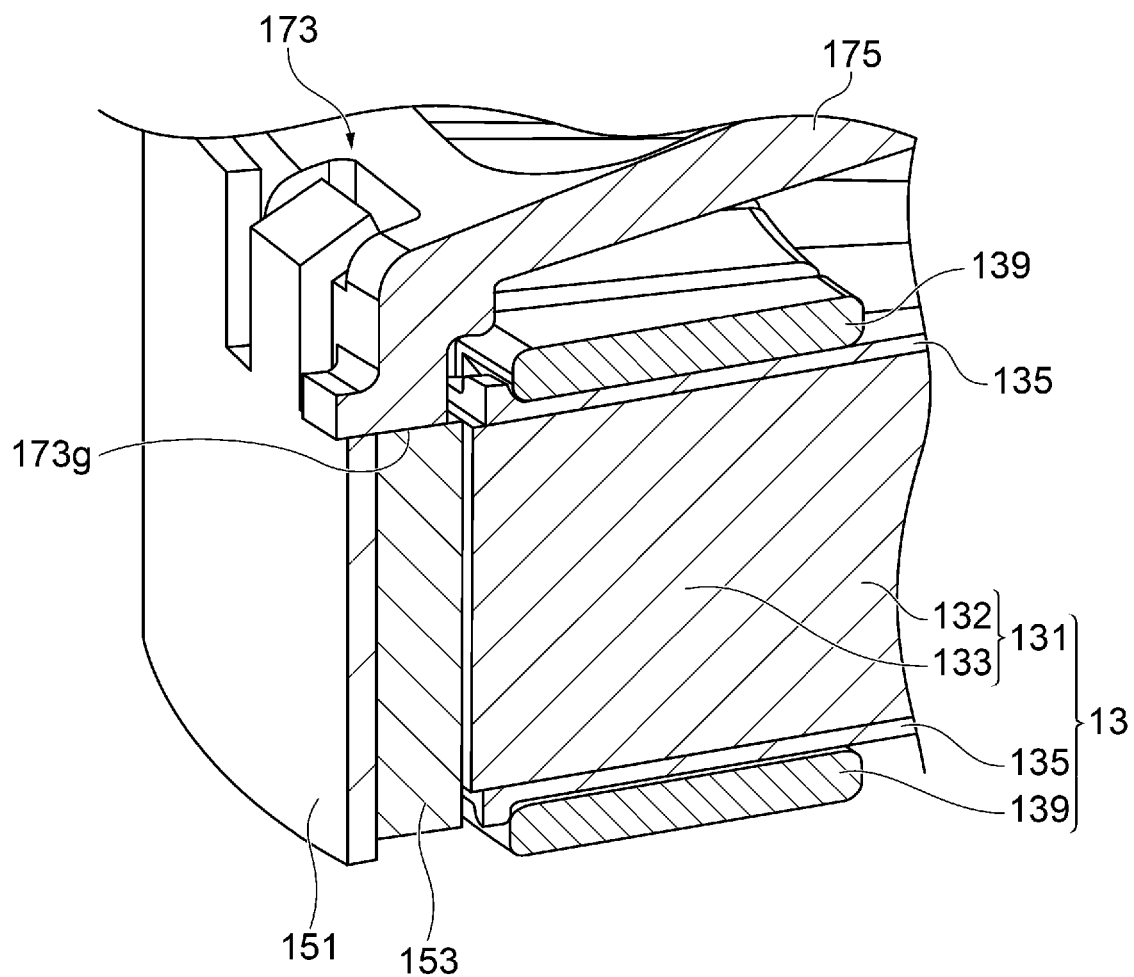
FIG. 3 is a partial cross-sectional perspective view around a region of a stator and a rotor near an outer periphery of a motor according to an embodiment of the present invention, with the stator and the rotor opposing to each other in a radial direction in the region.

FIG. 1 is a perspective view illustrating an overall configuration of an outer rotor type motor 1 according to an embodiment of the present invention. FIG. 2 is a cross-sectional perspective view of the motor 1 according to the present embodiment. FIG. 3 is a partial cross-sectional perspective view around a region of a stator 13 and a rotor near an outer periphery of the motor 1 according to the present embodiment, with the stator and the rotor opposing to each other in a radial direction in the region.

Figure 4:
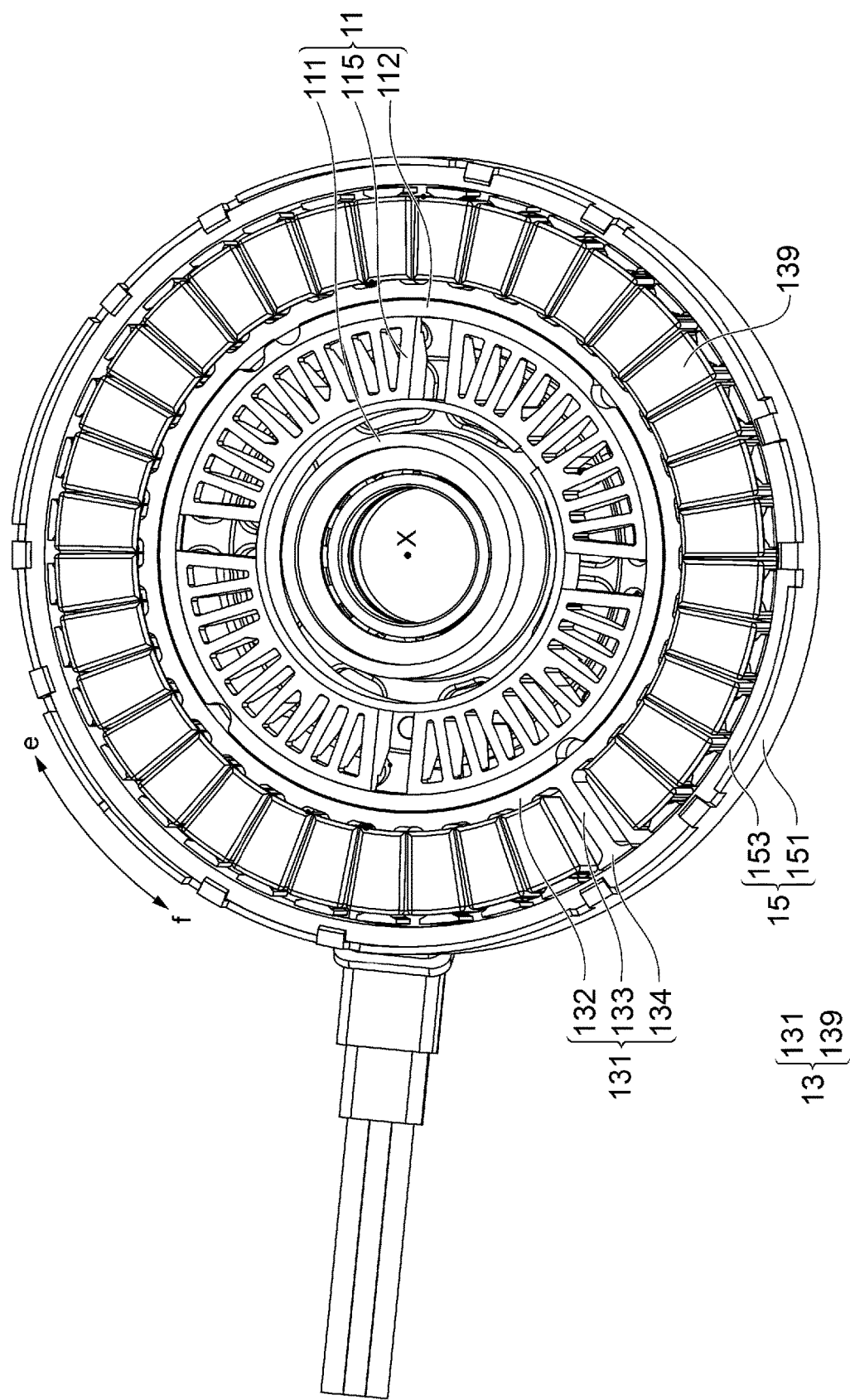
FIG. 4 is a perspective view illustrating a state before a holder of a motor according to an embodiment of the present invention is attached, and some members are removed for explanation.
Figure 5:
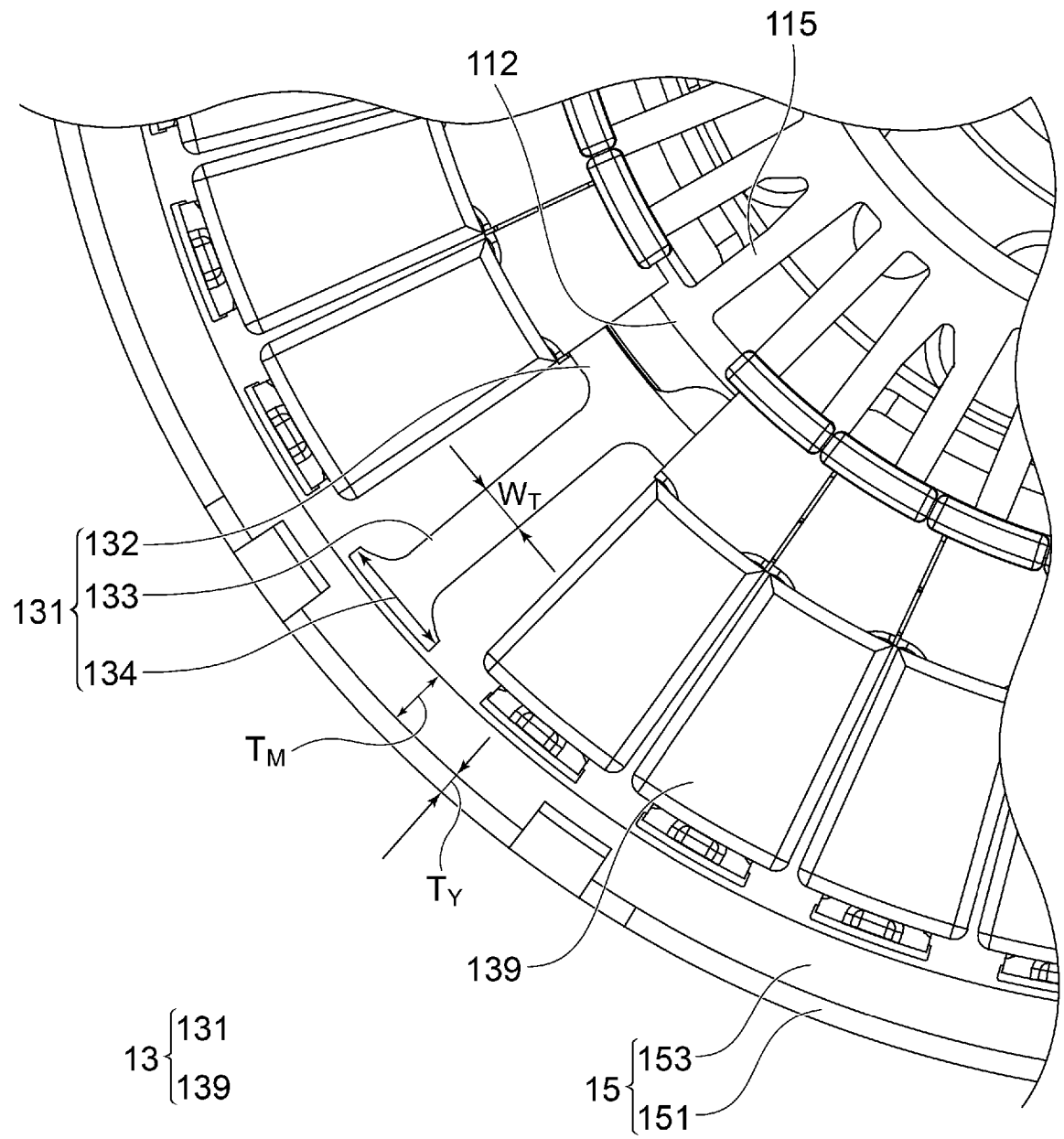
FIG. 5 is an enlarged plan view of a region illustrated by removing the some members in FIG. 4 and the periphery of the region.

FIG. 4 is a perspective view illustrating a state before a holder 17 of the motor 1 according to the present embodiment is attached, and some members (such as a coil 139 and an insulator 135) are removed for explanation. FIG. 5 is an enlarged plan view of a region illustrated by removing the some members in FIG. 4 and the periphery of the region.

Note that in the description of the present embodiment, for convenience, an extending direction of an axis X when the motor 1 rotates is referred to as a rotation axis X direction or an axial direction. In the following description, in the rotation axis X direction, for convenience, an arrow a direction is referred to as an upper side, and an arrow b direction is referred to as a lower side. In a radial direction perpendicular to the axis X, an arrow c direction away from the axis X is referred to as an outer peripheral side, and an arrow d direction toward the axis X is referred to as an inner peripheral side. In the following description, an upper side (arrow a direction) and a lower side (arrow b direction) refer to an up-down relationship of the motor 1 in the drawings, and do not necessarily correspond to an up-down relationship in the gravitational direction.

As illustrated in FIG. 1, the motor 1 is an outer rotor type brushless motor mounted to a floating moving body, such as a drone (not illustrated), for example. In the drone, it is known that an impact to a fuselage at the time of landing or falling damages the motor 1 for driving blades. Thus, the motor 1 according to the present embodiment has been devised to achieve weight reduction in order to reduce the impact at the time of landing or falling of the drone.

In the motor 1, a propeller (not illustrated) of the drone is attached to the upper side (arrow a direction), and the fuselage of the drone is attached to the lower side (arrow b direction). As illustrated in FIG. 2, the motor 1 mainly includes a stator holder 11, a stator 13, a rotor 15, a holder 17, and a bearing 19. The propeller of the drone is fixed to the holder 17 and the fuselage of the drone is fixed to the stator holder 11.

The stator holder 11 includes an inner peripheral portion 111 having a cylindrical shape, an outer peripheral portion 112 having a cylindrical shape, and a coupling portion 115. The inner peripheral portion 111 of the stator holder 11 is formed in a cylindrical shape or a substantially cylindrical shape extending in the rotation axis X direction. The inner peripheral portion 111 holds the bearing 19 at the surface (hereinafter referred to as an "inner peripheral surface") at the inner peripheral side (arrow d direction).

Specifically, the inner peripheral portion 111 holds an outer ring 19a of the bearing 19 at the upper side (arrow a direction) and holds an inner ring 19b of the bearing 19 at the lower side (arrow b direction), in the rotation axis X direction. In this case, the outer ring 19a of the bearing 19 is press-fitted to the inner peripheral surface of the inner peripheral portion 111 of the stator holder 11.

In other words, the inner peripheral portion 111 of the stator holder 11 functions as a bearing holder with respect to the bearing 19. The bearing 19 is a ball bearing, for example. However, the bearing 19 is not limited to this configuration, and various other bearings such as a sleeve bearing, for example, may be used.

Similar to the inner peripheral portion 111, the outer peripheral portion 112 of the stator holder 11 is formed in the cylindrical shape or the substantially cylindrical shape extending in the rotation axis X direction. Both the inner peripheral portion 111 and the outer peripheral portion 112 have the axis X as a center axis. A length of the outer peripheral portion 112 in the rotation axis X direction is shorter than a length of the inner peripheral portion 111 in the rotation axis X direction.

The coupling portion 115 is formed integrally with the inner peripheral portion 111 and the outer peripheral portion 112 between the inner peripheral portion 111 and the outer peripheral portion 112 of the stator holder 11. The coupling portion 115 couples the inner peripheral portion 111 and the outer peripheral portion 112 to each other. The coupling portion 115 extends from an end portion at an outer peripheral side to the outer peripheral side (arrow c direction) of the inner peripheral portion 111 and is connected to an end portion at an inner peripheral side of the outer peripheral portion 112.

A yoke (hereinafter referred to as a "stator yoke") 131 of the stator 13 is fixed to a surface (hereinafter referred to as an "outer peripheral surface") at an outer peripheral side of the outer peripheral portion 112. The stator 13 includes the stator yoke 131, an insulator 135, and a plurality of coils 139 wound around the stator yoke 131 via the insulator 135.

The stator yoke 131 is a laminate body such as a silicon steel sheet, and includes an annular portion 132, a plurality of coupling portions (hereinafter, also referred to as "teeth portions") 133 extending from the annular portion 132 toward the outer peripheral side (arrow c direction side), and a magnetic pole portion 134 connected to an outer peripheral end of each of the coupling portions 133. In the present embodiment, a plurality of the magnetic pole portions 134 extend in the circumferential direction, and the number (equal to the number of the coupling portions 133) of the magnetic pole portions 134 is 36.

An inner peripheral surface of the annular portion 132 of the stator yoke 131 is fixed to the outer peripheral surface of the outer peripheral portion 112 of the stator holder 11. The magnetic pole portions 134 of the stator yoke 131 protrude toward both sides (a clockwise direction e and a counterclockwise direction f) in the circumferential direction, and a gap between adjacent ones of the magnetic pole portions 134 is narrower compared to a gap (slot) between adjacent ones of the coupling portions 133.

As illustrated in FIG. 3, an insulator 135 formed of an insulating member is mounted to the coupling portion 133 of the stator yoke 131. The coil 139 is wound around the coupling portion 133 via the insulator 135. The coupling portion 133 of the stator yoke 131 and the coil 139 are electrically insulated via the insulator 135.

The rotor 15 includes a yoke (hereinafter referred to as a "rotor yoke") 151 and a rotor magnet 153. The rotor yoke 151 is an iron core having an annular and cylindrical shape extending in the rotation axis X direction. The rotor yoke 151 integrally holds the rotor magnet 153 in a state of surrounding the rotor magnet 153. The rotor yoke 151 prevents leakage of a magnetic field of the rotor magnet 153, and is formed of a magnetic body such as an iron core.

Similar to the rotor yoke 151, the rotor magnet 153 has the cylindrical shape extending in the rotation axis X direction. The rotor magnet 153 is held in close contact with an inner surface 151n of the rotor yoke 151 formed with high precision. The rotor magnet 153 surrounds the stator 13.

The rotor magnet 153 is continuously formed of a resin in an annular shape, and is generally referred to as a "bonded magnet" (hereinafter, may be simply referred to as a "bonded magnet"). Specifically, the rotor magnet 153 is a magnet formed by dispersing and arranging magnetic body by mixing and solidifying a fine powder of a rare earth such as neodymium and other magnetic body using a resin as a binder. Although the bonded magnet has a magnetic flux density smaller than a magnetic flux density of a sintered magnet, since the bonded magnet is lightweight and easily molded into any shape, the bonded magnet has many advantages such that degree of freedom in design and ease of assembly can be improved.

In an inner peripheral surface opposing the magnetic pole portion 134 of the stator yoke 131 in the rotor magnet 153, regions magnetized to S poles and regions magnetized to N poles are aligned so as to alternate along the circumferential direction. The number of magnetic poles (the sum of both regions of the S poles and the N poles) of the rotor magnet 153 will be described later. A height of the rotor magnet 153 in the rotation axis X direction is formed to be lower than a height of the rotor yoke 151 in the rotation axis X direction.

The holder 17 is formed of an aluminum alloy and has a disc shape as a whole. However, the present invention is not limited to this configuration, and the holder 17 may be formed of other materials such as a resin or a plastic. Note that the holder 17 is also formed with high precision by cutting out in a cutting process. However, the present invention is not limited to this configuration, and the holder 17 may be formed by press molding or the like.

As illustrated in FIGS. 1 and 2, the holder 17 includes an inner peripheral portion 171 provided at the inner peripheral side (arrow d direction side), an outer peripheral end portion 173 provided at an end portion at the outer peripheral side (arrow c direction side), and a spoke 175.

The inner peripheral portion 171 of the holder 17 includes a protruding portion 171d having a cylindrical shape provided with a through-hole 171h centered on the axis X, and a flange portion 171f extending in a radial direction from an end portion at the outer peripheral side of the protruding portion 171d. The flange portion 171f has a size capable of covering the inner peripheral portion 111 of the stator holder 11 from an upper side (arrow a direction).

The protruding portion 171d of the inner peripheral portion 171 includes an inner tubular portion 172 having a cylindrical shape extending in an up-down direction (arrow a and arrow b direction) about the axis X. The outer ring 19a and the inner ring 19b of the bearing 19 are held at an outer peripheral surface of the inner tubular portion 172 of the inner peripheral portion 171. In other words, the inner tubular portion 172 of the holder 17 functions as a rotation axis in the motor 1.

A plurality (six, for example) of the spokes 175 are connected to an end portion at an outer peripheral side (arrow c direction) of the flange portion 171f, and the outer peripheral end portion 173 having an annular shape is connected to a distal end portion in the radial direction of the spokes 175. In other words, the spokes 175 connect the flange portion 171f of the inner peripheral portion 171 and the outer peripheral end portion 173 to each other.

The outer peripheral end portion 173 of the holder 17 extends from an end edge at the outer peripheral side (arrow c direction) in the radial direction to the lower side (arrow b direction) along the rotation axis X direction, and the lower end 173g of the outer peripheral end portion 173 is fixed to and in contact with an upper ends of the rotor yoke 151 and the rotor magnet 153.

In the motor of interest of the present invention, an outer diameter of the rotor (reference numeral 15 in the present embodiment) is in a range from 80 mm to 100 mm. Here, the term "outer diameter of the rotor" refers to an outer diameter of the rotor yoke (rotor yoke 151) (in the present invention, the same applies hereinafter). In the present invention, for example, an outer diameter size useful as a motor used for the drone is in a range from 80 mm to 100 mm, and preferably in a range from 85 mm to 95 mm. Such an outer diameter size is suitable for balancing weight reduction and high torque.

In the present embodiment, being one example of the present invention, each of the plurality of magnetic pole portions 134 extends in the circumferential direction. By using the rotor magnet 153 continuously formed of the resin, the weight reduction is achieved as the motor 1, and by providing the magnetic pole portions 134 at the stator 13, the back electromotive force can be improved as the motor 1, so that the balance between the torque and the weight reduction can be ensured.

Under a condition of the motor of interest of the present invention, the number of the magnetic poles X (pieces) of the rotor magnet (reference numeral 153 in the present embodiment) suitable for improving the back electromotive force while achieving the weight reduction satisfies a following Equation (1).

$$X = 14 \times N \qquad \text{Equation (1)}$$

In the above-described Equation (1), X is the number of the magnet poles (pieces), and N is a positive integer.

Under the condition of the motor of interest of the present invention, the number of the magnetic pole portions (magnetic pole portions 134) Y of the stator (reference numeral 13 in the present embodiment) suitable for improving the back electromotive force while achieving the weight reduction satisfies a following Equation (2).

$$Y = 12 \times N \qquad \text{Equation (2)}$$

In the above-described Equation (2), Y is the number of the magnetic pole portions, and N is a positive integer and is common to the above-described N in Equation (1).

In the present embodiment, the number of the magnetic poles X of the rotor magnet 153 is 42, and the number of the magnetic pole portions 134 Y of the stator 13 is 36. In other words, in the present embodiment, the above-described Equation (1) (=14×3) and the above-described Equation (2) (=12×3) are satisfied, where N=3.

Under the condition of the motor of interest of the present invention, a value of N in the above-described Equation (1) and the above-described Equation (2) is preferably not too large. Specifically, N≤4 is preferable, and N≤3 is more preferable. On the other hand, a lower limit of N in the above-described Equation (1) and the above-described Equation (2) may be N=1, but N≥2 is more preferable.

In the motor of interest of the present invention, it is intended to balance the weight reduction and the torque in order to achieve high torque by improving the back electromotive force e while achieving the weight reduction by using the bonded magnet as the rotor magnet (reference numeral 153 in the present embodiment). Note that the back electromotive force e is equal to a generated voltage appearing at a terminal of the motor.

Note that the back electromotive force e can be expressed by the following Equation (3).

$$e = 2RNBL\omega = K_E \omega \qquad \text{Equation (3)}$$

In the above-described Equation (3), e represents a back electromotive force (V), R represents a rotation radius (m), N represents the number of turns of the coil, B represents a magnetic flux density (T), L represents an electric wire length (m) in the magnetic field, ω represents a rotational speed (rad/s), and $K_E$ represents a back electromotive force constant (Vs/rad).

Thus, in order to improve the back electromotive force e to increase the torque, the value of each element at the right side of Equation (3) only needs to be increased. Specific methods may include, for example, the following strategies.

The rotation radius R (m) is increased. Too large the diameter, the size and weight are increased, and thus, in the present invention, as described above, the outer diameter of the rotor is in the range from 85 mm to 95 mm as the preferable balance.

The number of turns N of the coil is increased. In the present invention, as will be described below, the coupling portions of the stator are made thinner, so that the gap (slot) between the coupling portions is increased, and the number of turns N of the coil can be increased.

The magnetic flux density (T) B is increased. In order to increase the magnetic flux density (T) B, specifically, the strength of the magnet may be improved, or the coupling portions of the stator may be formed to have an appropriate thickness. In the present invention, as will be described below, a width of the coupling portion of the stator in the circumferential direction is defined within an appropriate range.

An electric wire length L (m) in a magnetic field is increased. In order to increase the electric wire length L in the magnetic field, specifically, a height of the magnet (referred to the height in the axial direction. Same as "height" referred in the present paragraph) and a height of the stator core (the magnetic pole portions and the coupling portions) may be increased. In a case where the heights are increased, the thickness of the motor increases and the size and weight are increased, so that appropriate sizes may be appropriately selected and designed accordingly. Thus, in the present invention, the height of the magnet and the height of the stator core are not specified, but taking into consideration the outer diameter of the rotor of the present invention, the magnet height and the stator core height to be an appropriate balance may be selected from a range from approximately 3 mm to 30 mm, in consideration of a volume of the magnet required to rotate the rotor.

In the motor of interest of the present invention, in a case of assuming the outer diameter of the rotor (reference numeral 15 in the present embodiment) as 100, a width (reference numeral $W_T$ in FIG. 5 in the present embodiment. Hereinafter, referred to as "width $W_T$") in the circumferential direction of the coupling portion (coupling portion 133) of the stator (stator 13) in the circumferential direction. is preferably in a range from 1.5 to 2.5, and more preferably in a range from 1.7 to 2.2.

In the motor of interest of the present invention, the bonded magnet is used as the rotor magnet (reference numeral 153 in the present embodiment), and the maximum energy product of the bonded magnet is from 10 to 12 MGOe, and thus the maximum energy product is smaller than the maximum energy product (for example: 40 MGOe) of the rare earth sintered magnet. As a result, the magnetic flux density at the magnetic pole portions (magnetic pole portions 134) of the stator receiving the magnetic flux of the rotor magnet is decreased, and the width $W_T$ of the coupling portion (coupling portion 133) can be decreased (in other words, "thinner"). Thus, the weight reduction of the stator can be achieved.

However, when the width $W_T$ of the coupling portion is too small, magnetic saturation occurs at the coupling portions, and the driving efficiency of the motor decreases. Thus, as described above, in a case of assuming the outer diameter of the rotor as 100, the suitable range of the $W_T$ is from 1.5 to 2.5, and a more suitable range is from 1.7 to 2.2.

In the motor of interest of the present invention, in a case of assuming the outer diameter of the rotor (reference numeral 15 in the present embodiment) as 100, a thickness (reference numeral $T_M$ in FIG. 5 in the present embodiment. Hereinafter, may be referred to simply as a "thickness $T_M$") of the rotor magnet (reference numeral 153 in the present embodiment) in the radial direction. is preferably in a range from 1.5 to 2.5, and more preferably in a range from 1.7 to 2.4.

In the motor of interest of the present invention, in a case of assuming the outer diameter of the rotor (reference numeral 15 in the present embodiment) as 100, a thickness (reference numeral $T_Y$ in FIG. 5 in the present embodiment. Hereinafter, may be referred to simply as a "thickness $T_Y$") of the yoke (rotor yoke 151 in the present embodiment) of the rotor (reference numeral 15 in the present embodiment) in the radial direction. is preferably in a range from 0.5 to 1.0, more preferably in a range from 0.6 to 0.9, even more preferably in a range from 0.7 to 0.9, and particularly preferably in a range from 0.8 to 0.9.

Figure 6:
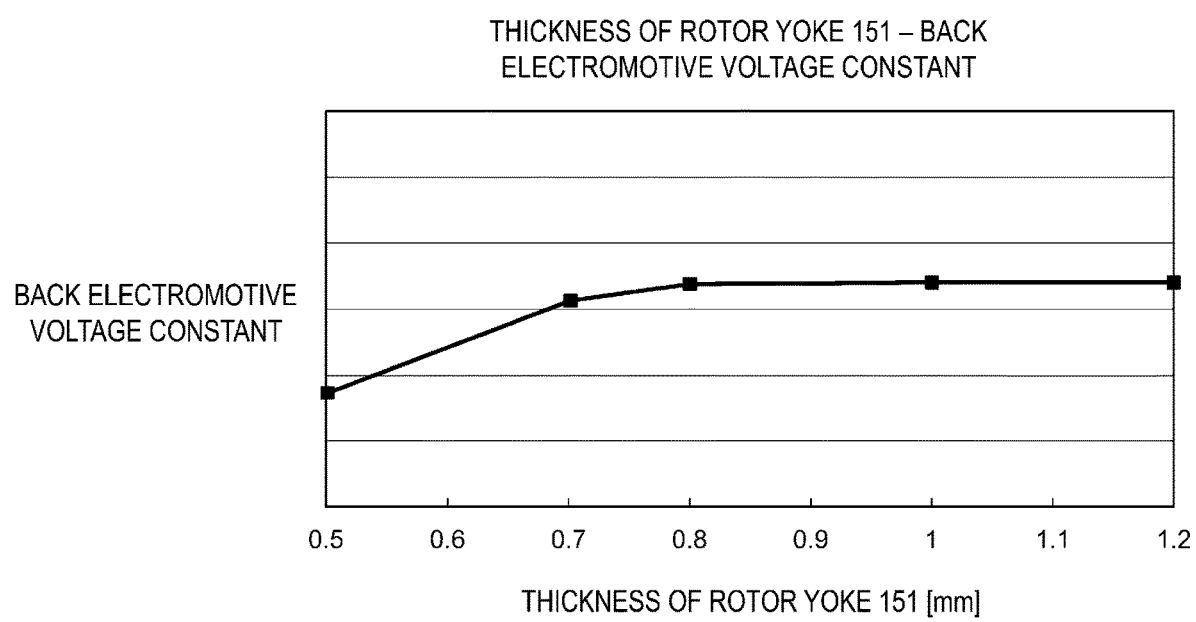
FIG. 6 is a graph of experimental results showing a relationship between a thickness $T_Y$ of a yoke of a rotor and a back electromotive voltage constant.

The present inventors have conducted a number of experiments in a round-robin manner while varying various conditions, and have conducted verification in order to determine an appropriate range for the width $W_T$ of the coupling portion of the stator, the thickness $T_M$ of the rotor magnet, and the thickness $T_Y$ of the rotor yoke. A relationship between the thickness $T_Y$ of the rotor yoke 151 and the back electromotive voltage constant is shown graphically in FIG. 6, by particularly taking experimental results among the numerous experimental results, the experimental results using the same motor as the motor 1 of the present embodiment, varying the thickness $T_Y$ of the rotor yoke 151, and keeping other conditions constant. In the graph of FIG. 6, the "thickness of the rotor yoke 151" in the horizontal axis indicates the thickness $T_Y$ assuming the outer diameter of the rotor 15 as 100.

As can be seen from the graph of FIG. 6, a tendency is indicated such that the back electromotive voltage constant increases as the rotation radius (m) in Equation (3) increases. Specifically, when the thickness $T_Y$ of the rotor yoke 151 is too thin, the back electromotive voltage constant becomes low, and the torque will be difficult to be ensured as the motor, but when the thickness $T_Y$ is 0.5 or greater, the back electromotive voltage constant becomes high to a certain degree, and when the thickness $T_Y$ is 0.6 or greater, and even 0.7 or greater, the back electromotive voltage constant further becomes high. When the thickness $T_Y$ is 0.8 or greater, the back electromotive voltage constant is substantially saturated. Thus, from the above results, it can be seen that the thickness $T_Y$ is preferably 0.5 or greater, more preferably 0.6 or greater, even more preferably 0.7 or greater, and particularly preferably 0.8 or greater.

Figure 7:
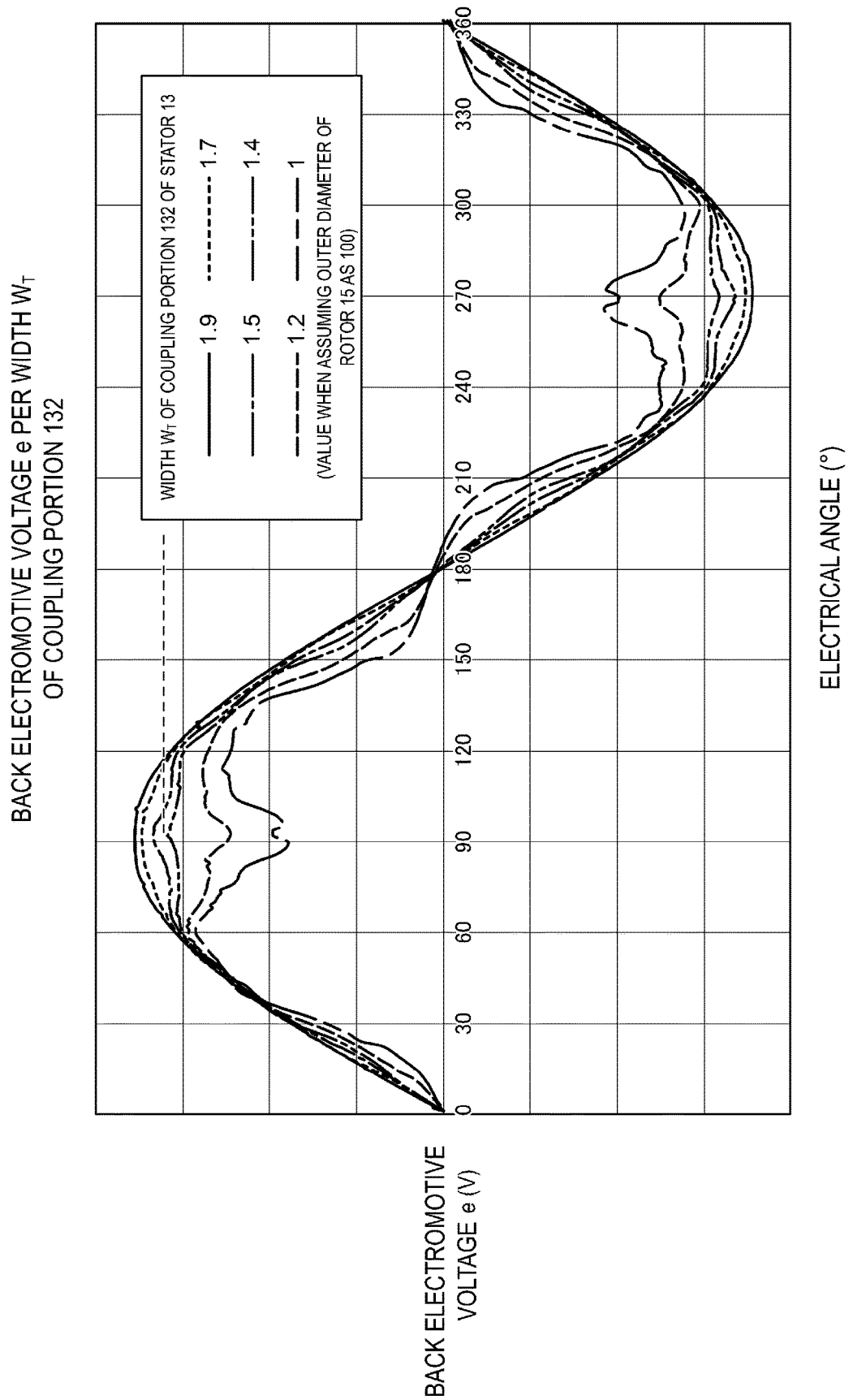
FIG. 7 is a graph of experimental results showing a relationship between an electrical angle)(° of a rotation axis and a back electromotive voltage e (V) when the motor is driven with varying a width $W_T$ of a coupling portion of a stator.

Similarly to the above, a relationship between an electrical angle)(° of the rotation axis and the back electromotive voltage e (V) when the motor is driven is shown graphically in FIG. 7, by taking experimental results among the numerous experimental results performed by the present inventors, the experimental results varying the width $W_T$ of the coupling portion 133 of the stator 13 and keeping other conditions constant. The graph of FIG. 7 is obtained by plotting each of the results of motors having different width $W_T$, with the horizontal axis being the electrical angle)(° and the vertical axis being the back electromotive voltage e (V).

As can be seen from the graph in FIG. 7, as the width $W_T$ becomes smaller, back electromotive voltage waveforms become distorted and peaks become lower. Thus, it can be seen from the above results that it is preferable that the distortion of the waveform at the back electromotive voltage is relatively small (a value of the peak is equal to a straight line of dashed line in the graph or greater), in other words the width $W_T$ is 1.5 or greater for achieving the high torque.

While the graphs of FIGS. 6 and 7 are results at certain conditions as described above, it has been confirmed that under the condition of the motor of interest of the present invention, even when various conditions are varied to some extent, there is no significant difference in the results, and a similar tendency has been observed. Thus, there is no doubt that the ranges described above are the preferred range for the thickness $T_Y$, the width $W_T$, and the thickness $T_M$.

As described above, the motor of the present invention is described with reference to the preferred embodiments, but the motor of the present invention is not limited to the configurations of the embodiments described above. For example, in the embodiment described above, description is made with reference to the example with the number of the spokes 175 of the holder 17 being six, but the number of spokes is not particularly limited, and a cover-like holder covering the entire body, instead of the spokes, may be used.

In addition, the motor according to the present invention may be appropriately modified by a person skilled in the art according to conventionally known knowledge. Such modifications are of course included in the scope of the present invention as long as these modifications still include the configuration of the present invention.

REFERENCE SIGNS LIST 1 motor, 11 stator holder, 13 stator, 15 rotor, 17 holder, 19 (19a and 19b) bearing, 111 inner peripheral portion, 112 outer peripheral portion, 115 coupling portion (coupling portion of stator holder), 131 stator yoke (yoke of stator), 132 annular portion, 133 coupling portion (teeth portion, coupling portion of stator), 134 magnetic pole portion, 135 insulator, 139 coil, 151 rotor yoke (yoke of rotor), 153 rotor magnet, 171 inner peripheral portion, 171d protruding portion, 171f flange portion, 171h through-hole, 172 inner tubular portion, 173 outer peripheral end portion, 173g lower portion of outer peripheral end portion

The invention claimed is:

1. A motor comprising:
a stator having an annular shape; and
a rotor including a rotor magnet surrounding the stator, wherein
an outer diameter of the rotor is in a range from 80 mm to 100 mm,
the stator includes a first yoke having an annular shape, a plurality of magnetic pole portions, a plurality of coupling portions connecting the first yoke and the plurality of magnetic pole portions to each other, and a plurality of coils each wound around each of the plurality of coupling portions,
the rotor magnet is continuously formed of a resin in an annular shape and includes a plurality of magnet poles,
the number of magnet poles of the rotor magnet is 14×N pieces, N being a positive integer,
the number of the plurality of magnetic pole portions is 12× N (pieces), and
each of the plurality of magnetic pole portions extends in a circumferential direction,
wherein a ratio of a width of each of the plurality of coupling portions in a circumferential direction to an outer diameter of the rotor is between 3:200 to 1:40.

2. The motor according to claim 1, wherein a ratio of a thickness of the rotor magnet in a radial direction to the outer diameter of the rotor is between 3:2 and 5:2.

3. The motor according to claim 1, wherein
the rotor includes a second yoke having an annular shape,
the rotor magnet is fixed to an inner surface of the second yoke of the rotor, and
wherein a ratio of the outer diameter of the rotor, to a thickness of the second yoke of the rotor in a radial direction is between 1:2 and 1:1.

4. A motor comprising:
a stator having an annular shape; and
a rotor including a rotor magnet surrounding the stator, wherein the stator includes a first yoke having an annular shape, a plurality of magnetic pole portions, a plurality of coupling portions connecting the first yoke and the plurality of magnetic pole portions to each other, and a plurality of coils each wound around each of the plurality of coupling portions,
the rotor magnet is continuously formed of a resin in an annular shape and includes a plurality of magnet poles,
the number of magnet poles of the rotor magnet is 14×N pieces, N being a positive integer,
the number of the plurality of magentic pole portions is 12×N pieces, and
each of the plurality of magnetic pole portions extends in a circumferential direction,
wherein a ratio of a width of each of the plurality of coupling portions in a circumferential direction to an outer diameter of the rotor is between 3:200 and 1:40.

5. The motor according to claim 4, wherein, a ratio of the outer diameter of the rotor to a thickness of the rotor magnet in a radial direction is between 3:2 to 5:2.

6. The motor according to claim 4, wherein
the rotor includes a second yoke having an annular shape,
the rotor magnet is fixed to an inner surface of the second yoke of the rotor, and
wherein a ratio of the outer diameter of the rotor to a thickness of the second yoke of the rotor in a radial direction is between 1:2 and 1:1.

* * * * *